(12) United States Patent
Fuchs et al.

(10) Patent No.: US 6,419,389 B1
(45) Date of Patent: Jul. 16, 2002

(54) X-RAY GENERATING SYSTEM HAVING A PHASE CHANGE MATERIAL STORE LOCATED IN THE COOLANT IN AN X-RAY RADIATOR HOUSING

(75) Inventors: Manfred Fuchs, Nuremberg; Erich Hell, Erlangen; Wolfgang Kutschera, Aurachtal; Thomas Ohrndorf, Altendorf, all of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/667,454

(22) Filed: Sep. 22, 2000

(30) Foreign Application Priority Data

Sep. 22, 1999 (DE) ......................................... 199 45 416

(51) Int. Cl.⁷ ............................................... H01J 35/00
(52) U.S. Cl. ........................ 378/199; 378/130; 378/141
(58) Field of Search ................................ 378/127, 130, 378/141, 199, 200, 121

(56) References Cited

U.S. PATENT DOCUMENTS

| | | | | |
|---|---|---|---|---|
| 4,572,864 A | * | 2/1986 | Benson et al. | 428/305.5 |
| 4,780,901 A | * | 10/1988 | Gabbay et al. | 378/141 |
| 4,995,065 A | * | 2/1991 | Janouin et al. | 378/130 |
| 5,507,337 A | | 4/1996 | Rafalovich | 165/63 |
| 5,703,926 A | | 12/1997 | Bischof | 378/200 |

FOREIGN PATENT DOCUMENTS

DE    197 41 750    3/1999

* cited by examiner

*Primary Examiner*—David P. Porta
*Assistant Examiner*—Therese Barber
(74) *Attorney, Agent, or Firm*—Schiff Hardin & Waite

(57) ABSTRACT

An x-ray generating system has an x-ray source arranged in a coolant-filled housing, and a phase change store which contains a phase change material disposed in the coolant in the housing.

8 Claims, 2 Drawing Sheets

X-RAY GENERATING SYSTEM HAVING A PHASE CHANGE MATERIAL STORE LOCATED IN THE COOLANT IN AN X-RAY RADIATOR HOUSING

BACKGROUND OF THE INVENTION

1. Field of the Invention

The present invention is directed to a cooling device for an x-ray radiator that has an x-ray source arranged in a housing filled with coolant.

2. Description of the Prior Art

Approximately 99% of the electrical energy utilized in the generation of x-rays with an x-ray source is converted into thermal energy. The heat arising in the operation of the x-ray source usually must be eliminated from the x-ray source in some manner in order to be able to operate the x-ray source over a longer time span for radiological exposures of a subject. This is particularly required when high x-ray power is needed as, for example, in computed tomography or angiography.

The cooling of known x-ray radiators having a rotating anode x-ray tube ensues such that the heat arising during operation of the rotating anode x-ray tube is intermediately stored in the anode dish and is transferred—mainly by thermal radiation—to a coolant and insulating oil contained in the housing of the x-ray radiator. The coolant and insulating oil usually circulates in a closed circulation loop through the housing of the x-ray radiator and a heat exchanger that is thermally conductively connected to the x-ray radiator, that transfers the heat absorbed from the cooling and insulating oil to, for example, ambient air. When the maximally allowed temperature of the cooling and insulating oil is reached during operation of the x-ray radiator, this leads to relatively long, forced pauses wherein the x-ray radiator cannot be operated.

X-ray radiators of this type are disclosed, for example, in German OS 196 12 698 and German OS 197 41 750. Each of these x-radiators has a housing filled with a coolant wherein a rotating bulb tube is arranged and that is charged with the coolant for cooling. The coolant preferably flows through the housing and a heat exchanger connected to the x-ray radiator.

SUMMARY OF THE INVENTION

An object of the present invention is to provide a cooling device of the type initially described which can be operated over a longer time span.

This object is inventively achieved in a cooling device for an x-ray radiator that has an x-ray radiation source arranged in a housing filled with coolant, at least one phase change store, referred to below as a PCM store, provided with a phase change material (PCM) and firmly conductively connected to the x-ray radiator. A PCM store is characterized in that the phase change material, for example paraffin or salt, goes through a phase conversion at a specific limit temperature, this being at approximately 54° C. for paraffin and approximately 72° C. for salt. The temperature of the phase change material remains practically constant during the phase change, which ensues upon introduction of energy, since the supplied energy is required for the phase conversion. The energy supplied for the phase conversion is thereby intermediately stored in the PCM store and is turn released upon reversal of the phase conversion. An increase in the temperature of the phase change material ensues again upon further application of energy only after the phase conversion of the phase change material, for example from the solid into the fluid aggregate state. Inventively, such a PCM store—as a component of a cooling device for an x-ray radiator—stores the thermal energy generated during operation of the x-ray radiator by means of its phase change material undergoing a phase conversion when its characteristic limit temperature is exceeded. Dependent on the volume and the nature of the phase change material of the PCM store, the temperature of the coolant of the x-radiator can be kept nearly constant over a certain time span despite the heat continuously arising during generation of x-rays. Compared to conventionally cooled x-ray radiators, the rise in the temperature of the coolant is retarded, so that a longer operating duration of the x-ray radiator is enabled.

U.S. Pat. No. 5, 507,337 discloses a heat pump and air-conditioning system that has a heat store provided with a phase change material.

In one version of the invention the PCM store is arranged in the coolant of the x-ray radiator. In this way, the PCM store can absorb thermal energy for the phase conversion of its phase change material directly from the coolant.

In other embodiments of the invention, the cooling device has a heat exchanger that is thermally conductively connected to the x-ray radiator and/or a storage vessel that is thermally conductively connected to the x-ray radiator that respectively contain at least one PCM store. The heat exchanger as well as the storage vessel increase the cooling capacity of the cooling device, whereby the heat of the x-ray radiator generated during operation thereof is transferred to and intermediately stored in the PCM store of the heat exchanger, preferably arranged at some distance from the x-ray radiator and/or of the storage vessel. In addition to the additional cooling of the x-ray radiator due to the output of heat of the heat exchanger and/or of the storage vessel, for example to the ambient air, this has the advantage that the energy being released in operating pauses of the x-ray radiator wherein the reverse phase conversion occurs, is not transferred only to the coolant of the x-radiator—as in the case of the arrangement of the PCM store in the housing of the x-radiator—but also is transferred to the air surrounding the heat exchanger and/or the storage vessel, resulting in the cooling and insulating oil of the x-radiator reaching normal temperature faster.

In versions of the invention the housing of the x-ray radiator and of the heat exchanger and/or the housing of the x-ray radiator and the storage vessel are connected to one another via lines such that the coolant can circulate through the housing of the x-ray radiator and the heat exchanger and/or through the housing of the x-ray radiator and through the storage vessel. Due to the circulation of the coolant, a more efficient heat transfer ensues from the x-ray radiator to each of the PCM stores arranged in the heat exchanger and/or in the storage vessel.

Since phase change materials exhibit only slight thermal conductivity, for which reason heat is absorbed and in turn emitted only slowly by phase change materials, in a preferred embodiment of the invention the PCM store is a matrix formed of a highly thermally conductive material into which the phase change materia is introduced. The limit temperature for the phase conversion of the thermally conductive material of the matrix is thereby so high that no phase conversion of the material ensues given utilization of the matrix in a cooling device for an x-ray radiator. As a result of introducing the phase change material into a matrix composed of a highly thermally conductive material, high charging and discharging currents can be advantageously achieved in the absorption or emission of heat by the PCM store. Moreover, no changes in volume of the PCM store occur upon temperature increases given an introduction of the phase change material into such a matrix, thereby simplifying the design of such a PCM store. Further, the introduction of the phase change material into a matrix causes the charging and the discharging temperature for the PCM store, i.e. the limit temperature at which the phase conversion occurs in the two directions, to be substantially the same.

It has also proven advantageous that the shape and size of a PCM store having a matrix can be very flexibly designed, so that an arrangement of the PCM store at arbitrary locations of the cooling device is possible with an appropriate design.

According to one version of the invention, the matrix is preferably formed of graphite.

DESCRIPTION OF THE PREFERRED EMBODIMENTS

Figure 1:
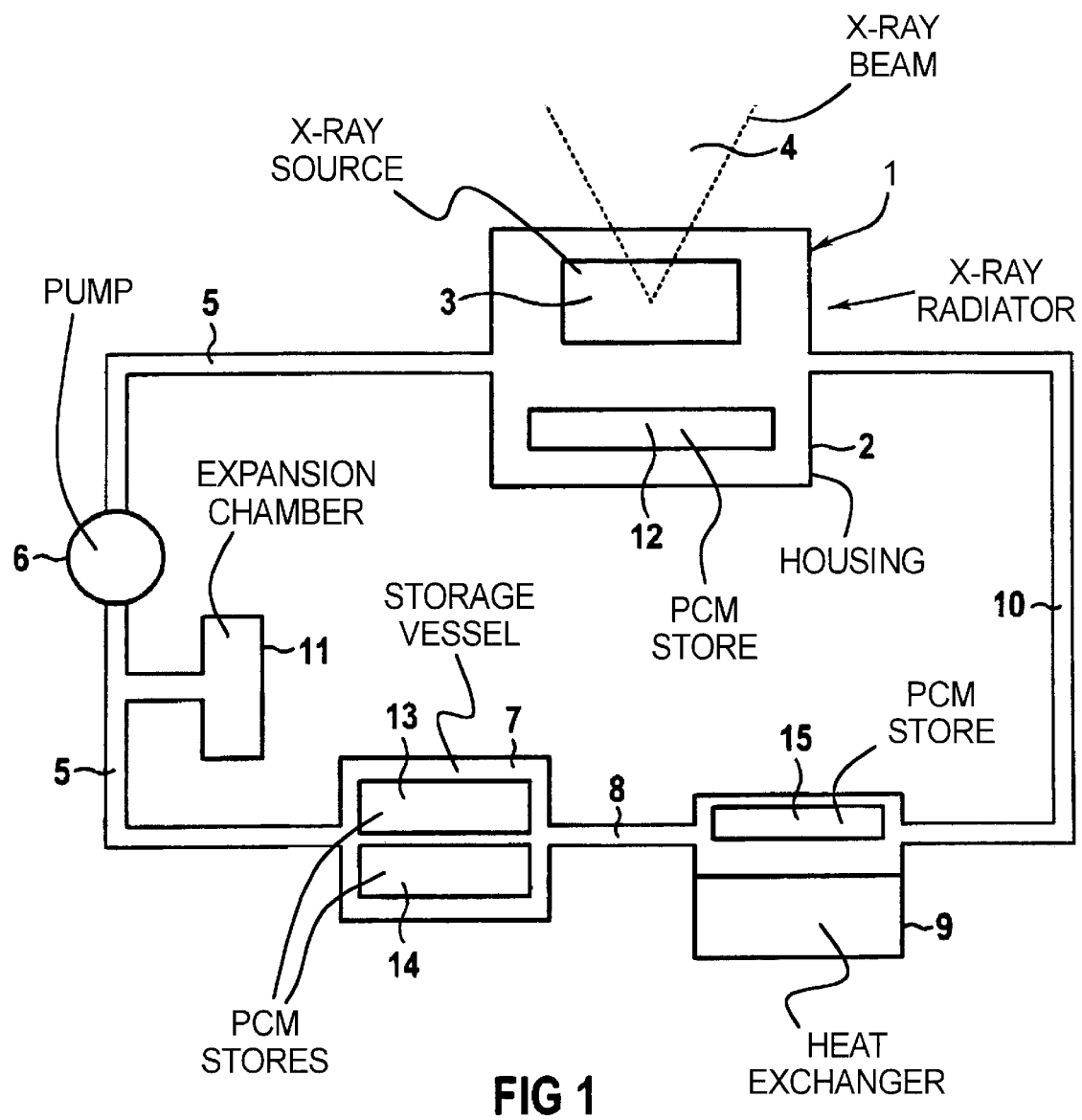
FIG. 1 is a schematic illustration of an inventive cooling device.

FIG. 1 shows an inventive cooling device for an x-ray radiator 1. The x-ray radiator 1 comprises a housing 2 in which an x-ray source 3 emitting an x-ray beam 4 is arranged and which is filled with a cooling and insulating oil that surrounds the x-ray source 3.

The housing 2 of the x-ray radiator 1 is connected via a line 5 to a pump 6 and to a storage vessel 7. The storage vessel 7 is connected via a line 8 to what is an oil-to-air heat exchanger 9 in the case of the present exemplary embodiment and the latter is connected via a line 10 to the x-ray radiator 1. The x-ray radiator 1, the storage vessel 7 and the heat exchanger 9 thus form a closed circuit in which cooling and insulating oil can circulate. The circulation of the cooling and insulating oil during operation of the x-ray radiator 1 is accomplished by the pump 6. An expansion chamber 11 connected to the line 5 serves for the acceptance of cooling and insulating oil that expands as a result of being heated.

Inventively, the cooling device has PCM stores for intermediate storage of the heat generated by the x-ray radiator 1 during operation, in order to be able to operate the x-ray radiator 1 over a longer time span. In the exemplary embodiment, a PCM store 2 is arranged in the x-ray radiator 1, two PCM stores 13, 14 are arranged in the storage vessel 7, and one PCM store 15 is arranged in a chamber of the heat exchanger 9 through which the cooling and insulating oil flows.

Each of the PCM stores 12 through 15 in the exemplary embodiment is fashioned such that its phase change material, for example, paraffin, salt or water, is introduced into a graphite matrix.

When, during operation of the x-ray radiator 1, the cooling and insulating oil heats as a result of the waste heat produced by the x-ray radiation source 3, the PCM store 12 as well as the PCM stores 13, 14 and 15 absorb heat from the cooling and insulating oil as a result of the circulation of the cooling and insulating oil accomplished by the pump 6. The phase conversion is accomplished when the limit temperature of the phase change material contained in the PCM stores 12 through 15 is thereby reached, whereby the temperature of the cooling and insulating oil is kept nearly constant until the end of the phase conversion, for example from the solid into the fluid aggregate state, since the heat transferred to the cooling and insulating oil by the x-ray source 3 during this phase of operation is practically completely withdrawn from the PCM stores 12 through 15 for the phase conversion.

In this way, the inherently steady temperature rise of the cooling and insulating oil can be interrupted by the PCM stores 12 through 15, and the temperature of the cooling and insulating oil can be kept constant during the phase conversion. The temperature of the cooling and insulating oil increases further given further application of energy only after the phase conversion of the phase change material.

Figure 2:
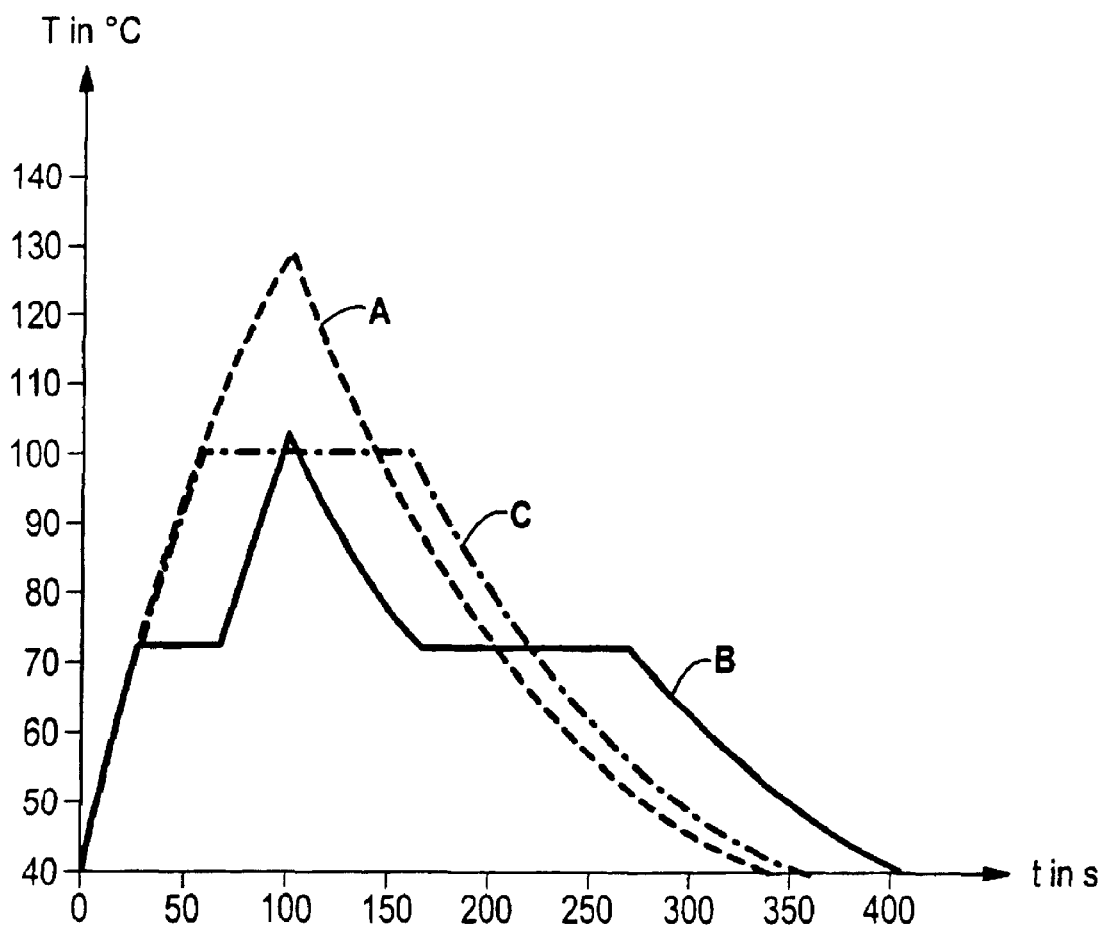
FIG. 2 shows the temperature curves of the inventive cooling device compared to the temperature curve of a known cooling device for an x-ray radiator.

FIG. 2 shows a comparative presentation of three simulated temperature curves A through C over time, normally for a known cooling device having an x-ray radiator and an oil-to-air heat exchanger (temperature curve A), for an inventive cooling device which, differing from the known cooling device, additionally has a PCM store having salt as the phase change material whose limit temperature lies at 72° C. (temperature curve B), and for an inventive cooling device that, differing from the known cooling device, has a PCM store with water as the phase change material whose limit temperature for the transition from the fluid into the vapor phase lies at 100° C. (temperature C).

The temperature curves A through C make clear that, given employment of a PCM store in a cooling device for an x-ray radiator and given a typical load cycle of an x-ray radiator of approximately 100 seconds, the maximum temperature of the cooling and insulating oil that occurs is clearly below the maximum temperature that occurs when a known cooling device is utilized for cooling the x-ray radiator. The delay of the temperature increase in the cooing and insulating oil as a consequence of the phase conversion of the salt from the solid into the fluid aggregate state at 72° C. can be seen from temperature curve B. It is clear from temperature curve C that no further temperature increase occurs after the limit temperature of 100° C. has been reached in the cooling and insulating oil, since the phase conversion of the water from the fluid into the vapor aggregate state ensues at 100° C., whereby the load cycle of the x-ray radiator has ended during this phase.

As can likewise be seen from temperature curves B and C, the cooling of the cooling and insulating oil in the cooling devices having a PCM store occurs more slowly than in the known cooling device. Since the temperature of the cooling and insulating oil remains constant during the phase conversion in the cooling phase as a result of the reverse phase conversion of the phase conversion material wherein the heat intermediately stored in the PCM stores is in turn emitted, further cooling of the cooling and insulating oil only ensues following the phase conversion.

In the exemplary embodiment, the cooling device has a storage vessel 7 and a heat exchanger 9, which need not necessarily be the case. The cooling device can have only one PCM store arranged in the cooling and insulating oil of the x-ray radiator or only one storage vessel having at least one PCM store that is thermally conductively connected to the x-ray radiator, or only a heat exchanger that is thermally conductively connected to the x-ray radiator and having a PCM store. Based on the exemplary embodiment, further, one or more PCM stores can also be placed at other arbitrary locations in the cooling device that differ from the disclosed locations.

Moreover, the storage vessel, the heat exchanger and the x-ray radiator need not necessarily be connected such that the cooling and insulating oil can circulate through the x-ray radiator, the storage vessel and the heat exchanger. The thermally conductive connection between the x-ray radiator and the storage vessel as well as the x-ray radiator and the heat exchanger can also be realized in some other way, for example, by means of copper lines.

Although modifications and changes may be suggested by those skilled in the art, it is the intention of the inventors to embody within the patent warranted hereon all changes and modifications as reasonably and properly come within the scope of their contribution to the art.

We claim:

1. An x-ray generating system comprising:
   an x-ray radiator having a housing filled with coolant and an x-ray source disposed in said housing; and
   a phase change store containing a phase change material disposed in said coolant in said housing.

2. An x-ray generating system as claimed in claim 1 further comprising a heat exchanger that is thermally conductively connected to said x-ray radiator, and a further phase change store containing a phase change material disposed in said heat exchanger.

3. An x-ray generating system as claimed in claim 2 further comprising lines connecting said x-ray radiator to said heat exchanger through which said coolant circulates through said housing of said x-ray radiator and through said heat exchanger.

4. An x-ray generating system as claimed in claim 1 further comprising a storage vessel for said coolant that is thermally conductively connected to said x-ray radiator, and a further phase change store containing a phase change material disposed in said storage vessel.

5. An x-ray generating system as claimed in claim 4 further comprising lines connecting said x-ray radiator and said storage vessel through which said coolant circulates through said housing of said x-ray radiator and said storage vessel.

6. An x-ray generating system as claimed in claim 1 wherein said phase change store comprises matrix of thermally conductive material, with said phase change material being introduced into said matrix.

7. An x-ray generating system as claimed in claim 6 wherein said matrix is comprised of graphite.

8. An x-ray generating system as claimed in claim 1 further comprising a heat exchanger and a storage vessel for said coolant, and a flow path for said coolant, connecting said housing of said x-ray radiator, said heat exchanger and said storage vessel in a closed loop, and wherein said a first phase change store disposed in said coolant in said housing of said x-ray radiator is a first phase change store, said x-ray generating system further comprising a second phase change store containing a phase change material disposed in said heat exchanger and a third phase change store containing a phase change material disposed in said storage vessel.

* * * * *